United States Patent
Garcia et al.

(10) Patent No.: US 10,296,380 B1
(45) Date of Patent: May 21, 2019

(54) DISTRIBUTED COMPUTING WITH ADAPTIVE PARALLELIZATION

(71) Applicant: Amazon Technologies, Inc., Seattle, WA (US)

(72) Inventors: Josue Isai Vazquez Garcia, Seattle, WA (US); Vasileios Lekakis, Seattle, WA (US); Sanjay Kumar, Kirkland, WA (US); Paul Kim, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 15/269,936

(22) Filed: Sep. 19, 2016

(51) Int. Cl.
*G06F 9/46* (2006.01)
*G06F 9/48* (2006.01)

(52) U.S. Cl.
CPC .......... *G06F 9/4887* (2013.01); *G06F 9/4881* (2013.01); *G06F 9/46* (2013.01)

(58) Field of Classification Search
CPC .... G06F 9/4887; G06F 9/4843; G06F 9/4881; G06F 9/46; G06F 9/50; G06F 9/5005; G06F 9/5072; G06F 9/5083; G06F 9/5038; G06F 9/5061
See application file for complete search history.

(56) References Cited

U.S. PATENT DOCUMENTS

| | | | | |
|---|---|---|---|---|
| 7,721,288 B2* | 5/2010 | Wu | ...................... | G06F 9/4843 370/230 |
| 8,219,432 B1* | 7/2012 | Bradley | ........... | G06Q 10/06311 705/7.13 |
| 8,271,987 B1* | 9/2012 | Willeford | ......... | G06Q 10/06311 705/7.12 |
| 8,296,419 B1* | 10/2012 | Khanna | ................. | G06F 9/5072 709/201 |
| 8,607,236 B2* | 12/2013 | Kawano | ................ | G06F 9/5038 718/100 |
| 8,813,073 B2* | 8/2014 | Kwon | ................... | G06F 9/5088 718/1 |
| 8,873,836 B1 | 10/2014 | Dietrich et al. | | |

(Continued)

OTHER PUBLICATIONS

Selvarani et al.; "Improved cost-based algorithm for task scheduling in cloud computing"; IEEE 2010 (Selvarani_2010.pdf; pp. 1-5) (Year: 2010).*

(Continued)

*Primary Examiner* — Hiren P Patel
(74) *Attorney, Agent, or Firm* — Robert C. Kowert; Meyertons, Hood, Kivlin, Kowert & Goetzel, P.C (57) ABSTRACT

Methods, systems, and computer-readable media for distributed computing with adaptive parallelization are disclosed. An execution time metric is determined based (at least in part) on execution of a batch of jobs. A quantity of partitions for an additional batch of jobs is determined based (at least in part) on the execution time metric and on a target metric. The additional batch of jobs is divided between a set of partitions of the determined quantity. Execution is initiated of the additional batch of jobs in the set of partitions. The set of partitions comprises at least a first partition and a second partition. A first subset of jobs in the first partition is executed in parallel with a second subset of jobs in the second partition.

20 Claims, 8 Drawing Sheets

(56) References Cited

U.S. PATENT DOCUMENTS

| | | | | |
|---|---|---|---|---|
| 8,935,702 | B2* | 1/2015 | Harris | G06F 9/5072 709/226 |
| 8,954,981 | B2* | 2/2015 | Harris | G06F 9/5072 709/226 |
| 9,128,763 | B2 | 9/2015 | Sarkar et al. | |
| 9,183,016 | B2 | 11/2015 | Zhou et al. | |
| 9,286,044 | B2 | 3/2016 | Boehm et al. | |
| 9,304,803 | B2 | 4/2016 | Nelson et al. | |
| 9,411,645 | B1 | 8/2016 | Duan et al. | |
| 9,858,124 | B1* | 1/2018 | Ghare | G06F 9/5083 |
| 9,996,573 | B1* | 6/2018 | Vig | G06F 17/30339 |
| 2005/0066330 | A1* | 3/2005 | Kanai | G06F 1/3203 718/102 |
| 2008/0052712 | A1* | 2/2008 | Gustafson | G06F 9/505 718/101 |
| 2008/0235697 | A1* | 9/2008 | Kobayashi | G06F 9/4881 718/103 |
| 2009/0187619 | A1* | 7/2009 | Shigeta | G06Q 10/06 709/201 |
| 2011/0061057 | A1* | 3/2011 | Harris | G06F 9/5072 718/104 |
| 2011/0131579 | A1* | 6/2011 | Tsukamoto | G06F 9/5027 718/101 |
| 2011/0247002 | A1* | 10/2011 | Salapura | G06F 9/5061 718/104 |
| 2012/0159507 | A1* | 6/2012 | Kwon | G06F 9/5088 718/104 |
| 2012/0324466 | A1* | 12/2012 | He | G06F 9/50 718/104 |
| 2013/0238900 | A1* | 9/2013 | Leggette | H04L 63/0428 713/165 |
| 2014/0068623 | A1* | 3/2014 | Kanemasa | G06F 9/4881 718/103 |
| 2014/0317635 | A1* | 10/2014 | Konno | G06F 9/505 718/105 |
| 2015/0254105 | A1* | 9/2015 | Nishimura | G06F 9/4881 718/103 |
| 2015/0268993 | A1* | 9/2015 | Montesinos Ortego | G06F 9/4881 718/106 |
| 2018/0024905 | A1* | 1/2018 | Kitajima | G06F 11/3423 |

OTHER PUBLICATIONS

Jeff Barr, "AWS Lambda—Run Code in the Cloud," Amazon.com, Nov. 2014, Retrieved from: https://aws.amazon.com/blogs/aws/run-code-cloud/ on Sep. 8, 2016, pp. 1-9.

\* cited by examiner

DISTRIBUTED COMPUTING WITH ADAPTIVE PARALLELIZATION

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogs of items offered for sale. For each item offered for sale, such electronic catalogs typically include at least one product detail page (e.g., a web page) that specifies various information about the item, such as a description of the item, one or more pictures of the item, as well as specifications (e.g., weight, dimensions, capabilities) of the item. Additionally, a marketplace may offer other types of pages to potential customers, such as a home page that introduces a customer to the marketplace and a search page that lists products relevant to one or more search terms. The merchant may seek to classify items along various dimensions, e.g., to determine whether the sale of particular items is permitted in particular countries. In a large catalog with millions of items, continuous classification and re-classification may be expensive and challenging.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for distributed computing with adaptive parallelization are described. Using the techniques described herein, an incoming stream of jobs may be partitioned for parallel execution. Batches of jobs in a stream may be received over time, e.g., by an adaptive parallelization service of a job execution system. For example, the jobs may include classification jobs for classifying items in a marketplace in various categories. The time to execute jobs may be monitored, and an execution time metric may be generated or updated based (at least in part) on the execution time for jobs in the most recently processed batch. The execution time metric may represent an exponential moving average of the execution time for jobs, and the metric may disregard "outliers" such as jobs that take an excessively long time. Based (at least in part) on the execution time metric, a quantity of partitions may be determined for execution of a new batch of jobs, where jobs in one partition may be executed in parallel with jobs in another partition. The quantity may be determined to meet a target throughput in view of the execution time metric. For example, if the target throughput is 100 jobs per second for a stream, and the execution time metric indicates 5 records per second (or 0.2 seconds per record) for a partition in the stream, then 20 partitions may be used for parallel execution of jobs in the stream. The jobs in the new batch may be divided between or among a set of partitions of the determined quantity for execution of the partitions in parallel. In one embodiment, the jobs may be provided to a job execution service for execution of the partitions in parallel (with corresponding parallel shards). In this manner, the parallelism of a set of computing resources used for execution of a stream of jobs may dynamically vary with the rate of jobs in the stream.

Figure 1:
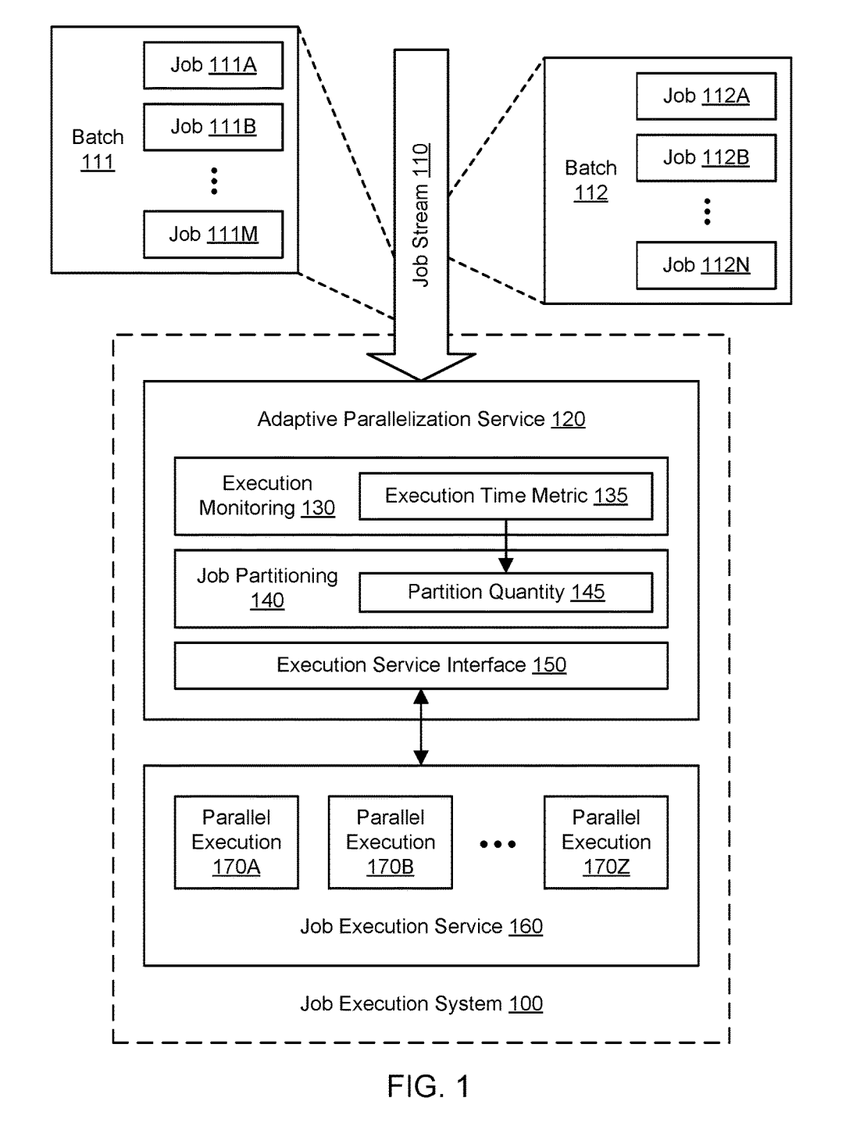
FIG. 1 illustrates an example system environment for distributed computing with adaptive parallelization, according to one embodiment.

FIG. 1 illustrates an example system environment for distributed computing with adaptive parallelization, according to one embodiment. The example system environment may represent a job execution system 100 that receives a stream 110 of jobs and causes them to be executed. As will be discussed in greater detail below, the job execution system 100 may use techniques for adaptive parallelization to execute some jobs in parallel with respect to other jobs. The stream 110 may include multiple batches over time. As shown in the example of FIG. 1, the stream 110 may include a batch 111 and a later-received batch 112. The batch 111 may include a set of jobs such as jobs 111A and 111B through 111M, and the batch 112 may include another set of jobs such as jobs 112A and 112B through 112N. The stream may include a series of individual jobs, but the jobs may not be divided into batches when received by the adaptive parallelization service 120; instead, the adaptive parallelization service may assign individual jobs to batches. Many but not necessarily all of the individual jobs in a later batch (such as batch 112) may be received later than the individual jobs in an earlier batch (such as batch 111). A batch may include any suitable number and configuration of jobs.

Any suitable jobs may be processed using the job execution system 100. For example, the jobs may include classification jobs for classifying items in a marketplace in various categories. For example, a marketplace item may be classified in (or out) of categories such as firearms, medications, hazardous materials, and other product characteristics for which restrictions on sale, mode of shipment, or import may exist in some locations in which the marketplace operates. The stream 110 may include records or other items of data that are sought to be processed using a particular function or application. For example, the stream 110 may indicate various marketplace items that have been added to a catalog or changed, and the items may be classified in the various categories according to one or more classifier functions. The classifier functions may use pattern matching for keywords within item descriptions. The jobs may typically have no interdependencies so that the adaptive parallelization service 120 may freely divide the jobs into different partitions that will be executed in parallel with respect to other partitions. The stream 110 may represent a nearly continuous or constant source of jobs for the job execution system 100. However, the rate of jobs in the stream 110 (e.g., the number of jobs received per unit of time) may vary over time, sometimes widely. Any suitable technique may be used to determine the size or contents of a batch of jobs. For example, a particular batch may be deemed complete after a certain amount of time has passed or after a certain number of jobs have been added to the batch.

The adaptive parallelization service 120 may include components or functionalities such as an execution monitoring component 130, a job partitioning component 140, and an execution service interface 150. The execution monitoring component 130 may measure the execution times for jobs. Based on the execution times for jobs, the execution monitoring component 130 may determine and/or update an execution time metric 135. In one embodiment, the execution time metric 135 may be updated periodically based (at least in part) on execution times for the most recently processed batch. The metric may be updated at suitable intervals, e.g., after each job is successfully executed or after an entire batch is processed. The job partitioning component 140 may divide the jobs in a particular batch into a set of partitions. In one embodiment, each partition may contain one or more jobs. The number of partitions in the set may match a partition quantity 145 determined by the job partitioning component 140 (or by any other suitable component of the adaptive parallelization service 120). The partition quantity 145 may be determined based (at least in part) on the execution time metric 135 and to meet a target throughout. The execution time metric 135 and partition quantity 145 may change from batch to batch (e.g., from batch 111 to batch 112), e.g., as the observed execution times change or if the target throughput changes.

Using the execution service interface 150, the adaptive parallelization service 120 may interact with a job execution service 160 to initiate the execution of jobs using the job execution service. The execution service interface 150 may represent any suitable interface(s), potentially including one or more application programming interfaces (APIs) or other programmatic interfaces, between the adaptive parallelization service 120 and the job execution service 160. The job execution service 160 may be configured to execute some jobs in parallel with respect to other jobs. The job execution service 160 may use any suitable components to perform parallel job execution, such as a plurality of parallel execution components 170A-170Z. Although three parallel execution components 170A, 170B, and 170Z are shown for purposes of illustration and example, it is contemplated that any suitable number and configuration of such components may be used with the job execution system 100. The parallel execution components 170A-170Z may also be referred to as shards. In one embodiment, the adaptive parallelization service 120 may configure the number of shards associated with the stream 110 to match the partition quantity 145. In one embodiment, each partition may be assigned to a different shard such that jobs in one partition (and one shard) may be executed in parallel with respect to jobs in other partitions (and other shards). In one embodiment, the job execution service 120 may represent a service such as Amazon Web Services (AWS) Lambda that can execute functions provided by clients. Upon successful execution of a job, the job execution service 160 may provide the results to the client or to an external component associated with the job, such as a storage system usable for storage of the results. For example, in the case of a classification job, any classifications determined for a marketplace item may be sent to a downstream service or system.

Figure 8:
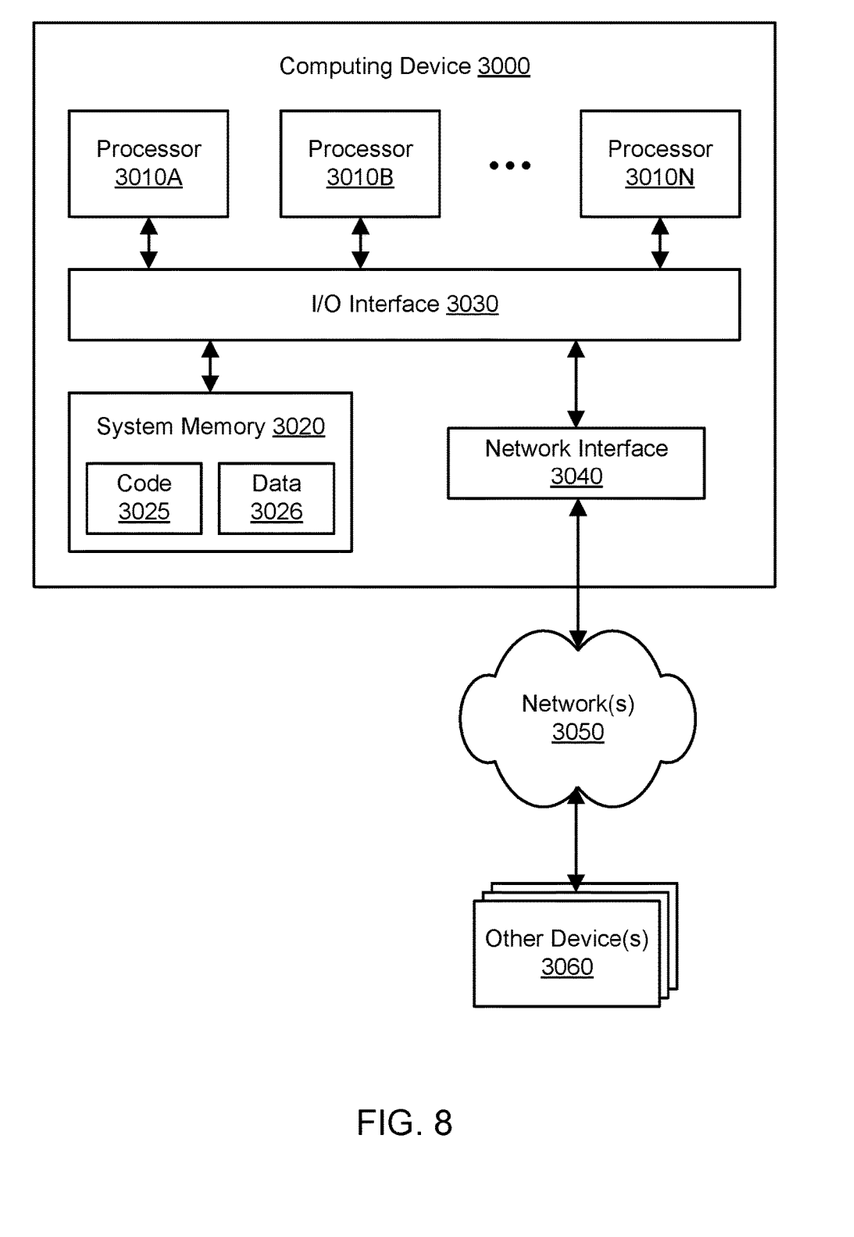
FIG. 8 illustrates an example computing device that may be used in some embodiments.

The job execution system 100 may be implemented using any suitable number and configuration of computing devices, any of which may be implemented by the example computing device 3000 illustrated in FIG. 8. The computing devices may be located in any suitable number of data centers or geographical locations. In various embodiments, the functionality of the different components of the job execution system 100 may be provided by the same computing device or by different computing devices. If any of the components of the job execution system 100 are implemented using different computing devices, then the components and their respective computing devices may be communicatively coupled, e.g., via one or more networks. Each of the components of the job execution system 100 may represent any combination of software and hardware usable to perform their respective functions, as discussed as follows. Operations implemented by the job execution system 100 may be performed automatically, e.g., without a need for user initiation or user intervention after an initial configuration stage, and programmatically, e.g., by execution of program instructions on at least one computing device. It is contemplated that the job execution system 100 may include additional components not shown, fewer components than shown, or different combinations, configurations, or quantities of the components shown.

The use of adaptive parallelization as described herein may permit the job execution system 100 to avoid numerous potential drawbacks of a fixed parallelization scheme. With fixed parallelization, an administrator may be required to manually tune the parallelization rather than let the adaptive parallelization service 120 do so automatically and programmatically. A fixed parallelization scheme may not fully exploit the capabilities of a highly elastic job execution service such as AWS Lambda. If a parallelism value is fixed to a sufficiently high value, greater coldstart penalties may be incurred when containers are used for the first time (in some cases, after being reclaimed as idle by the job execution service). If a parallelism value is fixed to a sufficiently low value, throughput may be insufficient. In general, the use of a fixed and unchanging parallelism value may result in unstable throughput.

Figure 2:
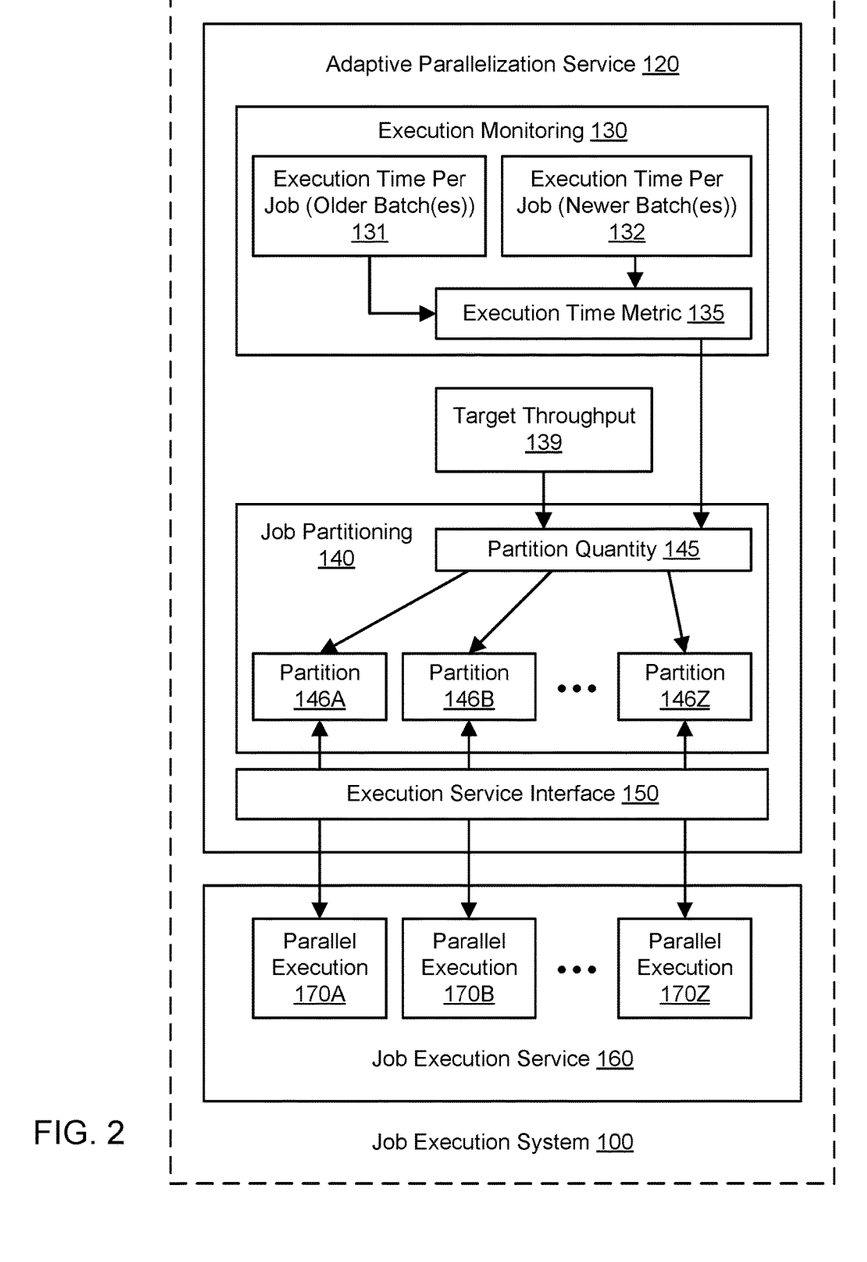
FIG. 2 illustrates further aspects of the example system environment for distributed computing with adaptive parallelization, including determination of a quantity of partitions based (at least in part) on an execution time metric and to meet a target throughput, according to one embodiment.

FIG. 2 illustrates further aspects of the example system environment for distributed computing with adaptive parallelization, including determination of a quantity of partitions based (at least in part) on an execution time metric and to meet a target throughput, according to one embodiment. The execution of a batch of jobs from a stream may be implemented using a job execution service 160 to which the adaptive parallelization service 120 sends the jobs. The job execution service 160 may be configured with a set of shards (such as shards 170A-170Z) associated with the stream. Jobs in a batch may be partitioned into a set of partitions such as partitions 146A and 146B through 146Z. The partitions 146A-146Z may be assigned to shards 170A-170Z. For example, each partition may be assigned to a particular shard.

The quantity 145 of partitions of jobs (and the related quantity of shards) may be determined based (at least in part) on an execution time metric 135 and to meet one or more target metrics. In one embodiment, the target metric(s) may include a target throughput 139. The use of a target throughput as a goal for the adaptive parallelization service 120 may offer, to a client, a particular quality of service in the processing of jobs from a client's stream. Other examples of suitable target metrics may include a quality of service metric, a cost metric (e.g., cost per unit of time), an energy usage metric (e.g., energy usage per unit of time), and other performance metrics. In some embodiments, the partition quantity 145 may be determined to meet one target metric; in other embodiments, the partition quantity may be determined to meet more than one target metric. The partition quantity 145 may also be referred to as a parallelism value. The execution time metric 135 may represent a value associated with the execution times for prior jobs in the stream. The time to execute jobs may be monitored, and the execution time metric 135 may be periodically generated or updated based (at least in part) on the execution time for jobs in the most recently processed batch. The execution time for a particular job may be determined on any suitable basis. For example, the execution time for a particular job may be determined by measuring the difference between the time at which the adaptive parallelization service sends the job to the job execution service and the time at which the adaptive parallelization service receives an indication of successful execution from the job execution service.

In one embodiment, the execution time metric may represent the execution time per job per partition or per shard. The execution time metric 145 may be determined based (at least in part) on execution times 132 for the one or more recently processed batches of jobs and also on execution times for one or more older batches of jobs. The execution time metric may represent an exponential moving average of the execution time for jobs per shard and may thus be influenced by multiple prior batches, with greater weight given to the most recently processed batch(es). In one embodiment, the execution time metric may disregard "outliers" such as jobs that take an excessively long time, e.g., relative to some factor of the current average execution time. For example, when a container is first used in the job execution service, the job may take substantially more time than if the container had been previously used, but such a "cold start" penalty may be excluded from the execution time metric. The execution time metric may exclude failures and retries of failures. In one embodiment, an exponential backoff strategy may be used to retry failed jobs, with increasingly long delays between retries until the job succeeds or is abandoned. If the current batch of jobs is the first batch in the stream, or otherwise if the stream is relatively new, then insufficient execution time data may exist to determine the execution time metric in this manner. In such circumstances, the execution time metric or the partition quantity may be assigned a default value.

A quantity 145 of partitions (and corresponding quantity of shards) for the additional batch of jobs may be determined. The quantity 145 of partitions or shards may be determined based (at least in part) on the execution time metric 135. The quantity of partitions (and quantity of shards) may be determined to meet a target metric such as a target throughput 139. The target throughput 139 may be a stream-specific value, client-specific value, or system-wide value (e.g., encompassing multiple streams and/or multiple clients of the adaptive parallelization service). For example, if the target throughput 139 is 100 jobs per second for a stream, and the execution time metric indicates 5 records per second (or 0.2 seconds per record) for a partition or shard in the stream, then 20 partitions or shards may be used for parallel execution of jobs in the stream. The target throughput 139 may be determined on any suitable basis, such as a value entered by an administrator of the adaptive parallelization service or by the client responsible for a particular stream. Whether a batch is larger than, smaller than, or about the same size as the earlier batch(es), the number 145 of partitions for an additional batch may be determined based on the execution times for the earlier batch(es) (as captured in the execution time metric 135) and not on the size of the additional batch.

In one embodiment, the partition quantity 145 may also be determined based (at least in part) on one or more input values derived from machine learning techniques. For example, if the job execution system 100 (or another suitable component) observes that the stream 110 tends to be particularly busy at certain times of day, then such an observation may be used (potentially as a weighted term or element along with other terms or elements) to automatically increase the partition quantity 145 for those times of day. Such a pattern may be determined based (at least in part) on the monitoring of execution times for jobs.

In one embodiment, for each call to a shard, the time per record (or per job) may be measured as $F=t/r$. In one embodiment, an exponential moving average of F may be updated periodically, e.g., for each batch or each qualifying measurement. The exponential moving average may be calculated as $F_{avg}=\alpha F_{old}+(1-\alpha)F_{new}$, where $F_{new}$ includes the time per record for one or more recent batches and $F_{old}$ includes the time per record for one or more older batches. The value for $\alpha$ may be configured appropriately, e.g., as 0.75. For a target throughput T, the quantity of partitions (and shards) P may be calculated as $P=F_{avg}T$. The quantity of partitions P may be determined at appropriate intervals, e.g., prior to partitioning and initiating execution of a newly received batch. In one embodiment, the throughput $T_s$ of a shard can be estimated by $T_s=1/F$, and for a target throughput T, the job execution system may employ parallel shards of the quantity $P=T/T_s$ to achieve the target throughput T.

A batch of jobs may be divided between a set of partitions 146A-146N of the determined quantity 145. Jobs in a batch may be partitioned, and the partitions assigned to shards 170A-170Z, on any suitable basis. In one embodiment, jobs may be divided as evenly as possible into the partitions (and corresponding shards), such that some partitions (and corresponding shards) may be assigned more jobs than others if the number of jobs is not evenly divisible by the number 145 of partitions (and corresponding shards). Jobs may be said to be divided between a set of partitions, rather than among a set of partitions, to indicate that as few as two partitions may be used in some embodiments; however, it is contemplated that more than two partitions may be used. In some circumstances, only one partition (and shard) may be used for a batch, but typically multiple partitions (and shards) may be used. The jobs may typically have no interdependencies so that the adaptive parallelization service 120 may freely divide the jobs into different partitions that will be executed in parallel with respect to other partitions.

Execution of the batch of jobs may be initiated by the adaptive parallelization service 120 using a job execution service 160 to which the adaptive parallelization service sends the jobs. The job execution service 160 may be configured with a set of shards 170Z-170Z associated with the stream. In one embodiment, the number of shards may match the number 145 of partitions, and the number of shards may be configured by the adaptive parallelization service 120. From batch to batch, the set of shards 170A-170Z may shrink or grow based on the execution time metric and to meet the target throughput. Various partitions of jobs may assigned to various shards. Within each shard, jobs may be executed serially. However, jobs in different shards may be processed in parallel. The job execution service 160 may assess costs to a client based (at least in part) on the compute time used by the client and not necessarily on the number of shards. As an example, the same cost may be assessed for two jobs that take one second apiece to execute as for one job that takes two seconds to execute. In one embodiment, the execution service interface 150 may open a separate network connection to the job execution service 160 for each of the shards 170A-170Z.

For a particular shard, the job execution service 160 may execute a function within a stateless container; within the container, the same function may be used serially for different jobs representing different input data. The job execution service 160 may manage its own computing resources, e.g., such that the computing resources assigned to a smaller number of shards may be smaller in size and/or capability at a given time than the computing resources assigned to a larger number of shards at the same time. In one embodiment, the throughput of jobs in the stream may be a function of the number of partitions of jobs in the stream and the corresponding shards within the job execution service. Accordingly, the number of partitions and shards may be dynamically and periodically updated, e.g., for each batch in a stream, in order to implement adaptive parallelism for execution of jobs in the stream.

Figure 3:
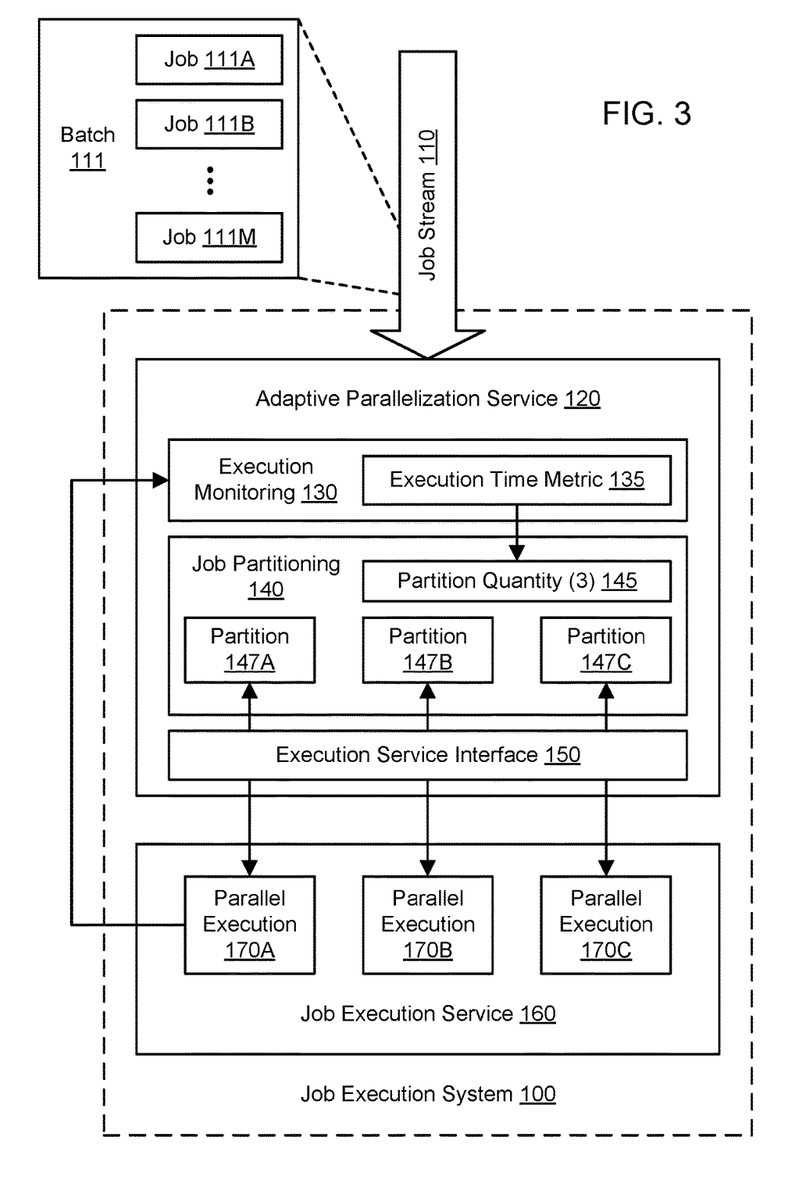
FIG. 3 illustrates further aspects of the example system environment for distributed computing with adaptive parallelization, including an example of job partitioning of a first batch of jobs from a stream, according to one embodiment.

FIG. 3 illustrates further aspects of the example system environment for distributed computing with adaptive parallelization, including an example of job partitioning of a first batch of jobs from a stream, according to one embodiment. As shown in the example of FIG. 3, a batch 111 of jobs 111A-111M may be received in the stream 110 by the adaptive parallelization service 120. The batch 111 may include any suitable number and configuration of jobs. The stream 110 may represent a nearly continuous or constant source of jobs for the job execution system 100. However, the rate of jobs in the stream 110 (e.g., the number of jobs received per unit of time) may vary over time, sometimes widely. The stream may include a series of individual jobs, but the jobs may not be divided into batches when received by the adaptive parallelization service 120; instead, the adaptive parallelization service may assign individual jobs to batches. Any suitable technique may be used to determine the size or contents of a batch of jobs. For example, a batch may be deemed complete after a certain amount of time has passed or after a certain number of jobs have been added to the batch. In some embodiments, the number of jobs may vary from batch to batch.

The quantity 145 of partitions of jobs (and the related quantity of shards) may be determined based (at least in part) on an execution time metric 135 and to meet a target throughput. The execution time metric 135 may represent a value associated with the execution times for prior jobs in the stream, e.g., as an exponential moving average of execution times per job and per shard. In the example of FIG. 3, the partition quantity 145 has been determined to be three. Based on this quantity 145, three partitions 147A, 147B, and 147C are used for the batch 111. The batch 111 of jobs may be divided between the set of partitions 147A-147C of the determined quantity 145. Jobs in the batch 111 may be partitioned, and the partitions 147A-147C assigned to shards 170A-170C, on any suitable basis. In one embodiment, jobs may be divided as evenly as possible into the partitions (and corresponding shards), such that some partitions (and corresponding shards) may be assigned more jobs than others if the number of jobs is not evenly divisible by the number 145 of partitions (and corresponding shards).

Execution of the batch 111 of jobs may be initiated by the adaptive parallelization service 120 using the job execution service 160 to which the adaptive parallelization service sends the jobs. In one embodiment, the quantity of the shards 170A-170C may match the quantity 145 of the partitions 147A-147C, and the quantity of shards may be configured by the adaptive parallelization service 120. Within each shard, jobs may be executed serially. However, jobs in different shards may be processed in parallel.

The time to execute the jobs 111A-111M may be monitored, and the execution time metric 135 may be generated again or updated based (at least in part) on the execution time for jobs in the most recently processed batch 111. The execution time for a particular job may be determined on any suitable basis. For example, the execution time for a particular job may be determined by measuring the difference between the time at which the adaptive parallelization service sends the job to the job execution service and the time at which the adaptive parallelization service receives an indication of successful execution from the job execution service. However, the execution times for the jobs 111A-111M may affect only the partitioning and parallelization for subsequent batches and not for the batch 111.

Figure 4:
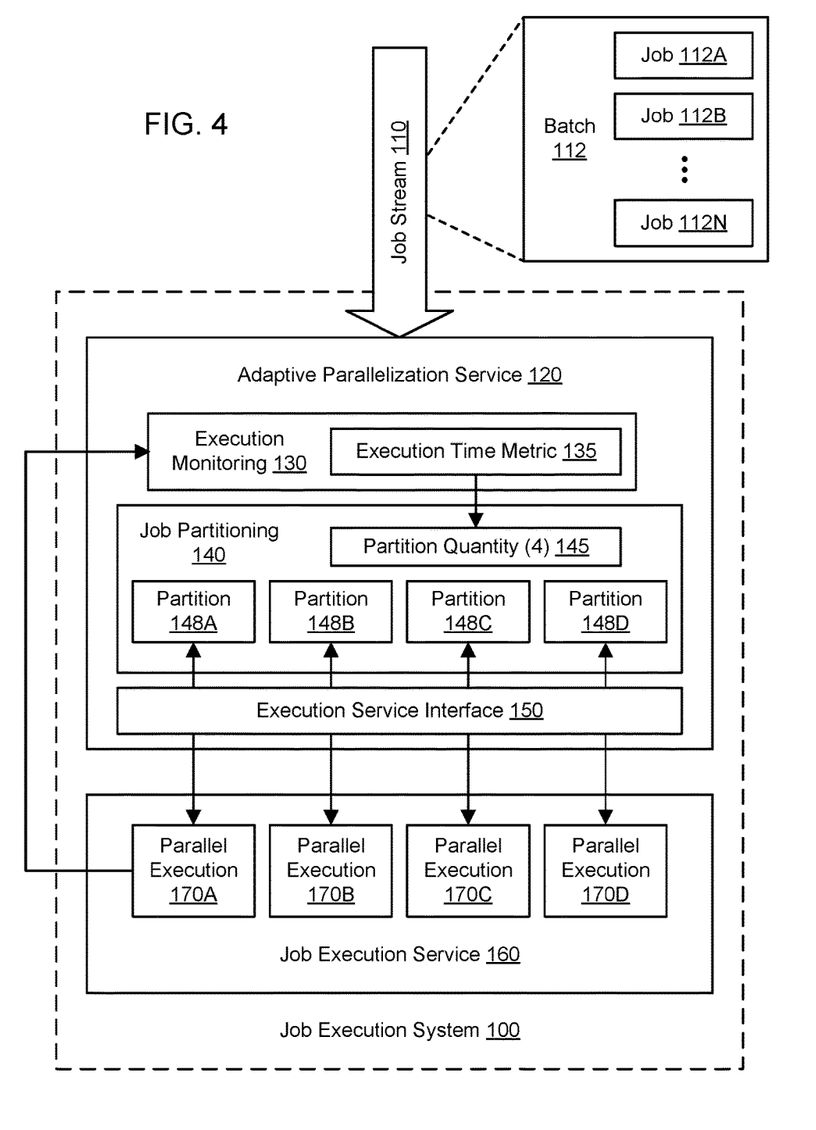
FIG. 4 illustrates further aspects of the example system environment for distributed computing with adaptive parallelization, including an example of job partitioning of a second batch of jobs from a stream using an increased number of partitions, according to one embodiment.

FIG. 4 illustrates further aspects of the example system environment for distributed computing with adaptive parallelization, including an example of job partitioning of a second batch of jobs from a stream using an increased number of partitions, according to one embodiment. As shown in the example of FIG. 4, another batch 112 of jobs 112A-112N may be received in the stream 110 by the adaptive parallelization service 120 subsequent to the batch 111. The batch 112 may include any suitable number and configuration of jobs. As discussed above, the rate of jobs in the stream 110 (e.g., the number of jobs received per unit of time) may vary over time, sometimes widely. In the examples of FIG. 3 and FIG. 4, the number of jobs in the batch 112 may differ from the number of jobs in the batch 111.

The quantity 145 of partitions of jobs (and the related quantity of shards) may be determined again or updated based (at least in part) on an execution time metric 135 and to meet a target throughput. The execution time metric 135 may represent a value associated with the execution times for prior jobs in the stream, including the execution times for the batch 111, e.g., as an exponential moving average of execution times per job and per shard. In the example of FIG. 4, the partition quantity 145 has been determined to be four. The partition quantity 145 may typically be increased in this manner if execution times have increased for prior jobs but the target throughput has remained the same. In this manner, adaptive parallelization may dynamically adjust the number of partitions and the corresponding number of shards used for parallel execution based (at least in part) on observations of recent execution times. Based on this revised quantity 145, four partitions 148A, 148B, 148C, and 148D are used for the batch 112. The batch 112 of jobs may be divided between the set of partitions 148A-148D of the determined quantity 145. Jobs in the batch 112 may be partitioned, and the partitions 148A-148D assigned to shards 170A-170D, on any suitable basis. In one embodiment, jobs may be divided as evenly as possible into the partitions (and corresponding shards), such that some partitions (and corresponding shards) may be assigned more jobs than others if the number of jobs is not evenly divisible by the number 145 of partitions (and corresponding shards).

Execution of the batch 112 of jobs may be initiated by the adaptive parallelization service 120 using the job execution service 160 to which the adaptive parallelization service sends the jobs. In one embodiment, the quantity of the shards 170A-170D may match the updated quantity 145 of the partitions 148A-148D, and the quantity of shards may be configured by the adaptive parallelization service 120. Within each shard, jobs may be executed serially. However, jobs in different shards may be processed in parallel. The time to execute the jobs 112A-112N may be monitored, and the execution time metric 135 may be generated again or updated based (at least in part) on the execution time for jobs in the most recently processed batch 112. However, the execution times for the jobs 112A-112N may affect only the partitioning and parallelization for subsequent batches and not for the batch 112.

Figure 5:
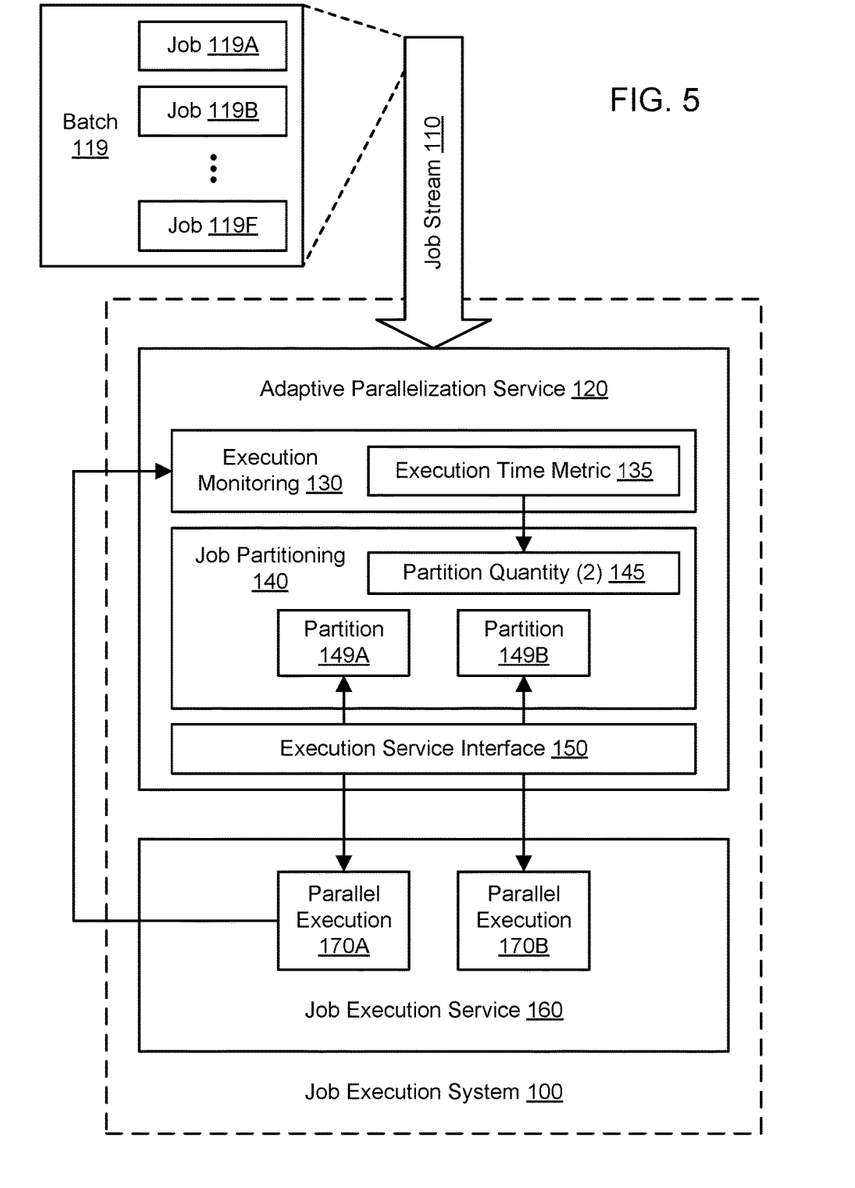
FIG. 5 illustrates further aspects of the example system environment for distributed computing with adaptive parallelization, including an example of job partitioning of a further batch of jobs from a stream using a decreased number of partitions, according to one embodiment.

FIG. 5 illustrates further aspects of the example system environment for distributed computing with adaptive parallelization, including an example of job partitioning of a further batch of jobs from a stream using a decreased number of partitions, according to one embodiment. As shown in the example of FIG. 5, yet another batch 119 of jobs 119A-119F may be received in the stream 110 by the adaptive parallelization service 120 subsequent to the batches 111 and 112. The batch 119 may include any suitable number and configuration of jobs. As discussed above, the rate of jobs in the stream 110 (e.g., the number of jobs received per unit of time) may vary over time, sometimes widely. In the examples of FIG. 4 and FIG. 5, the number of jobs in the batch 119 may differ from the number of jobs in the batch 112.

The quantity 145 of partitions of jobs (and the related quantity of shards) may be determined again or updated based (at least in part) on an execution time metric 135 and to meet a target throughput. The execution time metric 135 may represent a value associated with the execution times for prior jobs in the stream, including the execution times for the batch 112 and potentially for the batch 111, e.g., as an exponential moving average of execution times per job and per shard. In the example of FIG. 5, the partition quantity 145 has been determined to be two. The partition quantity 145 may typically be decreased in this manner if execution times have decreased for prior jobs but the target throughput has remained the same. In this manner, adaptive parallelization may dynamically adjust the number of partitions and the corresponding number of shards used for parallel execution based (at least in part) on observations of recent execution times. Based on this revised quantity 145, two partitions 149A and 149B are used for the batch 119. The batch 119 of jobs may be divided between the set of partitions 149A and 149B of the determined quantity 145. Jobs in the batch 119 may be partitioned, and the partitions 149A and 149B assigned to shards 170A and 170B, on any suitable basis. In one embodiment, jobs may be divided as evenly as possible into the partitions (and corresponding shards), such that some partitions (and corresponding shards) may be assigned more jobs than others if the number of jobs is not evenly divisible by the number 145 of partitions (and corresponding shards).

Execution of the batch 119 of jobs may be initiated by the adaptive parallelization service 120 using the job execution service 160 to which the adaptive parallelization service sends the jobs. In one embodiment, the quantity of the shards 170A and 170B may match the updated quantity 145 of the partitions 149A and 149BH, and the quantity of shards may be configured by the adaptive parallelization service 120. Within each shard, jobs may be executed serially. However, jobs in different shards may be processed in parallel. The time to execute the jobs 119A-119F may be monitored, and the execution time metric 135 may be generated again or updated based (at least in part) on the execution time for jobs in the most recently processed batch 119. However, the execution times for the jobs 119A-119F may affect only the partitioning and parallelization for subsequent batches and not for the batch 119.

Figure 6:
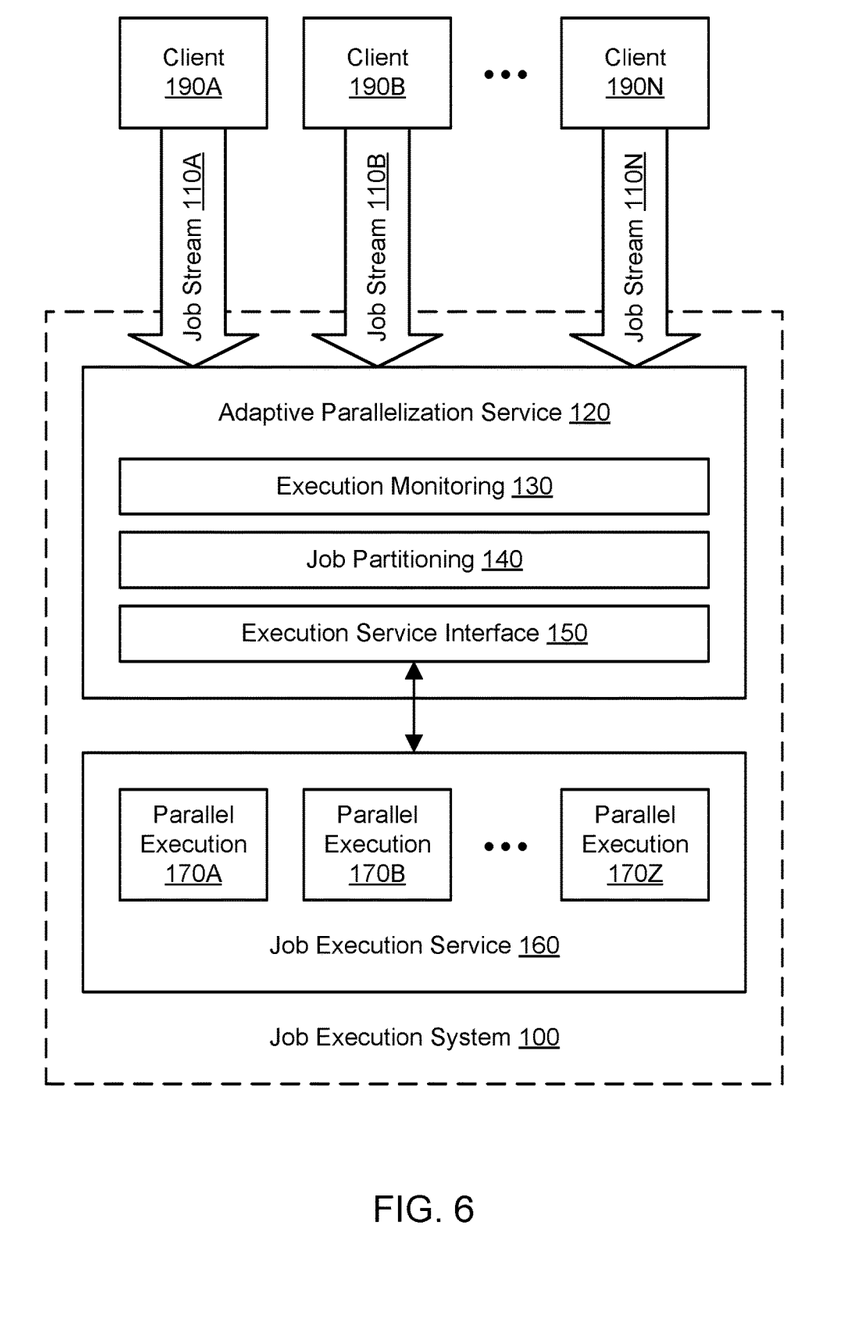
FIG. 6 illustrates further aspects of the example system environment for distributed computing with adaptive parallelization, including offering the functionality of an adaptive parallelization service to multiple clients, according to one embodiment.

FIG. 6 illustrates further aspects of the example system environment for distributed computing with adaptive parallelization, including offering the functionality of an adaptive parallelization service to multiple clients, according to one embodiment. The adaptive parallelization service 120 may be implemented in a service-oriented system in which multiple services (such as the job execution service 160) collaborate according to a service-oriented architecture. In such an environment, the adaptive parallelization service 120 may offer its functionality to multiple clients 190A-190N. Each client may provide one or more streams of jobs, such as stream 110A from client 190A, stream 110B from client 190B, and stream 110N from client 190N. Although clients 190A and 190B through 190N are shown for purposes of illustration and example, it is contemplated that any suitable number and configuration of clients may interact with the adaptive parallelization service 120. To enable clients to invoke its functionality, the adaptive parallelization service 120 may expose any suitable interface(s), such as one or more APIs or other programmatic interfaces and/or graphical user interfaces (GUIs). The adaptive parallelization service 120 may include a plurality of different instances that are distributed throughout one or more networks, and each instance may offer access (e.g., read access) the functionality of the adaptive parallelization service 120 to various clients. The functionality of the adaptive parallelization service 120 may be offered to the clients 190A-190N in exchange for fees.

One or more of the clients 190A-190N may represent external devices, systems, or entities with respect to the adaptive parallelization service 120. The client devices 190A-190N may be implemented using any suitable number and configuration of computing devices, any of which may be implemented by the example computing device 3000 illustrated in FIG. 8. Clients 190A-190N may convey network-based service requests to the job execution system 100 via one or more networks. In various embodiments, the network(s) may encompass any suitable combination of networking hardware and protocols necessary to establish network-based communications between client devices 190A-190N and job execution system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the job execution system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the job execution system 100. It is noted that in some embodiments, client devices 190A-190N may communicate with the job execution system 100 using a private network rather than the public Internet.

In one embodiment, aspects of the adaptive parallelization service 120 and/or job execution service 160 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. For example, virtual compute instances in the multi-tenant provider network may be concurrently used for the processing of jobs by client 190A as well as by client 190B.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 7:
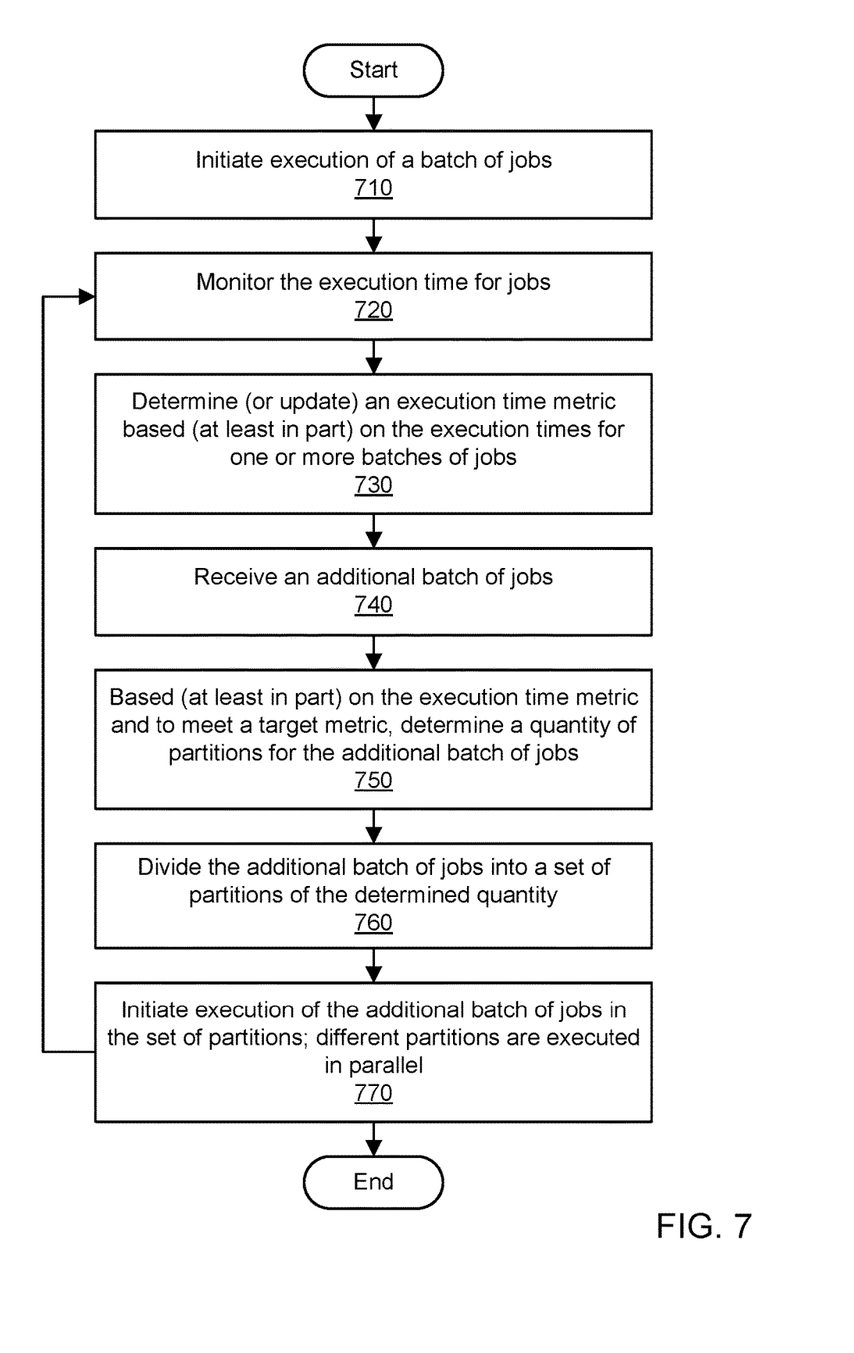
FIG. 7 is a flowchart illustrating a method for distributed computing with adaptive parallelization, according to one embodiment.

FIG. 7 is a flowchart illustrating a method for distributed computing with adaptive parallelization, according to one embodiment. As shown in 710, execution of a batch of jobs may be initiated. The batch of jobs may be received by an adaptive parallelization service of a job execution system. The adaptive parallelization service may be implemented in a service-oriented system (in which multiple services collaborate according to a service-oriented architecture) and may offer its functionality to multiple clients, each providing one or more streams of jobs. Any suitable jobs may be processed using the job execution system. For example, the jobs may include classification jobs for classifying items in a marketplace in various categories. The stream may include records or other items of data that are sought to be processed using a particular function or application. For example, the stream may indicate various marketplace items that have been added to a catalog or changed, and the items may be classified in the various categories according to one or more classifier functions. The stream may represent a nearly continuous or constant source of jobs for the job execution system. However, the rate of jobs in the stream (e.g., the number of jobs received per unit of time) may vary over time, sometimes widely. Any suitable technique may be used to determine the size or contents of a batch of jobs. For example, a batch may be deemed complete after a certain amount of time has passed or after a certain number of jobs have been added to the batch.

The execution of the batch of jobs may be implemented using a job execution service to which the adaptive parallelization service sends the jobs. The job execution service may be configured with a set of shards associated with the stream. Jobs may be partitioned and assigned to shards. For example, each partition may be assigned to a particular shard. Within each shard, jobs may be executed serially. However, jobs in different shards may be processed in parallel. The number of shards used by the job execution service to execute a particular batch of jobs may be configured by the adaptive parallelization service. The job execution service may assess costs to a client based (at least in part) on the total compute time used by the client across all of the client's shards, not necessarily on the number of shards. For a particular shard, the job execution service may execute a function within a stateless container; within the container, the same function may be used serially for different jobs representing different input data. The job execution service may manage its own computing resources, e.g., such that the computing resources assigned to a smaller number of shards may be smaller in size and/or capability than the computing resources assigned to a larger number of shards. In one embodiment, the throughput of jobs in the stream may be a function of the number of partitions of jobs in the stream and the corresponding number of shards within the job execution service. Accordingly, the number of partitions and shards may be dynamically and periodically updated, e.g., for each batch in a stream, in order to implement adaptive parallelism for execution of jobs in the stream.

The quantity of partitions of jobs (and the related quantity of shards) may be determined based (at least in part) on an execution time metric and to meet a target metric such as a target throughput. The execution time metric may represent a value associated with the execution times for prior jobs in the stream. The time to execute jobs may be monitored, and the execution time metric may be generated or updated periodically based (at least in part) on the execution time for jobs in the most recently processed batch. If the current batch of jobs is the first batch in the stream, or otherwise if the stream is relatively new, then insufficient execution time data may exist to determine the execution time metric in this manner. In such circumstances, the execution time metric or the partition quantity may be assigned a default value. Jobs in a batch may be partitioned and assigned to shards on any suitable basis. In one embodiment, jobs may be divided as evenly as possible into the shards, such that some shards may be assigned more jobs than others if the number of jobs is not evenly divisible by the number of shards.

As shown in 720, the execution time for the current batch of jobs may be monitored. The execution time for a particular job may be determined on any suitable basis. For example, the execution time for a particular job may be determined by measuring the difference between the time at which the adaptive parallelization service sends the job to the job execution service and the time at which the adaptive parallelization service receives an indication of successful execution from the job execution service.

As shown in 730, the execution time metric may be determined based (at least in part) on the execution of the most recently processed batch of jobs. Determining the execution time metric may include updating the metric based on recently executed jobs, e.g., using execution times for the most recent batch. In one embodiment, the execution time metric may represent the execution time per job and per partition or per shard. The execution time metric may represent an exponential moving average of the execution time for jobs per shard and may thus be influenced by multiple prior batches, with greater weight given to the most recently processed batch(es). In one embodiment, the execution time metric may disregard "outliers" such as jobs that take an excessively long time. For example, when a container is first used in the job execution service, the job may take substantially more time than if the container had been previously used, but such a "cold start" penalty may be excluded from the execution time metric. In one embodiment, the execution time metric may be updated for each job that is successfully executed.

As shown in 740, an additional batch of jobs in the stream may be received, e.g., by the adaptive parallelization service of the job execution system. In one embodiment, the jobs in the additional batch may represent different input values to be processed using the same function(s) as the jobs in the earlier batch. As discussed above, for example, the stream may indicate various marketplace items that have been added to a catalog or changed, and the items may be classified in the various categories according to one or more classifier functions. The rate of jobs in the stream may vary over time, sometimes widely. The additional batch may be larger (in terms of the number of jobs) than the earlier batch, smaller than the earlier batch, or about the same size as the earlier batch. In various embodiments, the operation shown in 740 may be performed before or after the operation shown in 730.

As shown in 750, a quantity of partitions (and corresponding quantity of shards) for the additional batch of jobs may be determined. The quantity of partitions or shards may be determined based (at least in part) on the execution time metric. As discussed above, the execution time metric may represent a value associated with the execution time for prior jobs in the stream. The quantity of partitions (and quantity of shards) may be determined to meet a target metric such as a target throughput. The target throughput may be a stream-specific value, client-specific value, or system-wide value (e.g., encompassing multiple streams and/or multiple clients of the adaptive parallelization service). For example, if the target throughput is 100 jobs per second for a stream, and the execution time metric indicates 5 records per second (or 0.2 seconds per record) for a partition or shard in the stream, then 20 partitions or shards may be used for parallel execution of jobs in the stream. The target throughput may be determined on any suitable basis, such as a value entered by an administrator of the adaptive parallelization service or by the client responsible for a particular stream. Whether the additional batch is larger than, smaller than, or about the same size as the earlier batch(es), the number of partitions for the additional batch may be determined based on the execution times for the earlier batch(es) (as captured in the execution time metric) and not on the size of the additional batch.

As shown in 760, the additional batch of jobs may be divided between a set of partitions of the quantity determined in 750. Jobs may be said to be divided between a set of partitions, rather than among a set of partitions, to indicate that as few as two partitions may be used in some embodiments; however, it is contemplated that more than two partitions may be used. In some circumstances, only one partition (and shard) may be used for a batch, but typically multiple partitions (and shards) may be used. Jobs in the additional batch may be partitioned and assigned to shards on any suitable basis. In one embodiment, jobs may be divided as evenly as possible into the partitions and corresponding shards, such that some partitions and shards may be assigned more jobs than others if the number of jobs is not evenly divisible by the number of partitions and shards.

As shown in 770, execution of the additional batch of jobs may be initiated. As discussed above, the execution may be implemented using a job execution service to which the adaptive parallelization service sends the jobs. The job execution service may be configured with a set of shards associated with the stream. In one embodiment, the number of shards may match the number of partitions, and the number of shards may be configured by the adaptive parallelization service. The set of shards may shrink or grow based on the execution time metric and to meet the target throughput. Various partitions of jobs may assigned to various shards. Within each shard, jobs may be executed serially. However, jobs in different shards may be processed in parallel. The job execution service may assess costs to a client based (at least in part) on the total compute time used by the client and not necessarily on the number of shards being used at any given time. For a particular shard, the job execution service may execute a function within a stateless container; within the container, the same function may be used serially for different jobs representing different input data. The job execution service may manage its own computing resources, e.g., such that the computing resources assigned to a smaller number of shards may be smaller in size and/or capability than the computing resources assigned to a larger number of shards. In one embodiment, the throughput of jobs in the stream may be a function of the number of partitions of jobs in the stream and the corresponding shards within the job execution service. Accordingly, the number of partitions and shards may be dynamically and periodically updated, e.g., for each batch in a stream, in order to implement adaptive parallelism for execution of jobs in the stream.

The method may proceed to the operation shown in 720 to monitor the execution time for the additional batch of jobs and then to the operation shown in 730 to update the execution time metric based (at least in part) on the execution times for the additional batch of jobs. As shown in 750, the number of partitions (and the related number of shards) may be further modified based on the updated execution time metric, e.g., to meet the target throughput. Accordingly, the operations shown in 720 through 770 may be performed again and again over time for a particular stream, as long as the stream provides batches of jobs to the job execution system. The operations shown in FIG. 7 may also be performed simultaneously for multiple streams, e.g., as provided by multiple clients of the adaptive parallelization service.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices comprising hardware and program instructions executable by the hardware to implement a job execution system, wherein the job execution system is configured to:
initiate execution of a first batch of jobs received from a stream;
determine an execution time metric based at least in part on an execution time per job for the first batch of jobs;
receive a second batch of jobs from the stream;
determine a quantity of partitions for the second batch of jobs, wherein the quantity of partitions is determined based at least in part on the execution time metric and to meet a target throughput;
divide the second batch of jobs between a set of partitions of the determined quantity, wherein the set of partitions comprises at least a first partition and a second partition; and
initiate execution of the second batch of jobs in the set of partitions, wherein a first subset of jobs in the first partition is executed in parallel with a second subset of jobs in the second partition.

2. The system as recited in claim 1, wherein the execution time metric comprises an exponential moving average of execution time per job for a plurality of batches of jobs.

3. The system as recited in claim 1, wherein the job execution system is configured to:
update the execution time metric based at least in part on the execution of the second batch of jobs;
determine an updated quantity of partitions for a third batch of jobs, wherein the updated quantity of partitions is determined based at least in part on the updated execution time metric and to meet the target throughput, and wherein the updated quantity of partitions is larger or smaller than the quantity of partitions used for the execution of the second batch;
divide the third batch of jobs between an updated set of partitions of the updated quantity; and
initiate execution of the third batch of jobs in the updated set of partitions, wherein jobs in different partitions of the updated set are executed in parallel.

4. The system as recited in claim 1, wherein the job execution system comprises an adaptive parallelization service in a service-oriented system, wherein the adaptive parallelization service is configured to perform determining the execution time metric, determining the quantity of partitions, and dividing the second batch of jobs between the set of partitions, and wherein the adaptive parallelization service is offered to a plurality of clients generating streams of jobs.

5. A computer-implemented method, comprising:
determining an execution time metric based at least in part on execution of a batch of jobs;
determining a quantity of partitions for an additional batch of jobs, wherein the quantity of partitions is determined based at least in part on the execution time metric and on a target metric;

dividing the additional batch of jobs between a set of partitions of the determined quantity, wherein the set of partitions comprises at least a first partition and a second partition; and initiating execution of the additional batch of jobs in the set of partitions, wherein a first subset of jobs in the first partition is executed in parallel with a second subset of jobs in the second partition.

6. The method as recited in claim 5, wherein the execution time metric comprises an exponential moving average of execution time per job for a plurality of batches of jobs, and wherein the target metric comprises a target throughput.

7. The method as recited in claim 5, further comprising:
updating the execution time metric based at least in part on the execution of the additional batch of jobs;
determining an updated quantity of partitions for a further batch of jobs, wherein the updated quantity of partitions is determined based at least in part on the updated execution time metric and on the target metric, and wherein the updated quantity of partitions is larger or smaller than the quantity of partitions used for the execution of the additional batch;
dividing the further batch of jobs between an updated set of partitions of the updated quantity; and
initiating execution of the further batch of jobs in the updated set of partitions, wherein jobs in different partitions of the updated set are executed in parallel.

8. The method as recited in claim 5, wherein an adaptive parallelization service in a service-oriented system performs determining the execution time metric, determining the quantity of partitions, and dividing the additional batch of jobs between the set of partitions, and wherein the adaptive parallelization service is offered to a plurality of clients generating streams of jobs.

9. The method as recited in claim 5, wherein initiating the execution of the additional batch of jobs comprises sending the additional batch of jobs to a job execution service, wherein a cost of using the job execution service is assessed based on compute time, and wherein the partitions are maintained within the job execution service.

10. The method as recited in claim 5, wherein determining the execution time metric comprises disregarding execution times for jobs that are determined to be outliers in length of execution time.

11. The method as recited in claim 5, wherein execution of the additional batch of jobs comprises execution of one or more classifier functions for items offered in a marketplace.

12. The method as recited in claim 5, wherein a set of computing resources used for execution of a stream of jobs increases in size or capability as the execution time metric increases and decreases in size or capability as the execution time metric decreases.

13. A non-transitory computer-readable storage medium storing program instructions computer-executable to perform:
determining an execution time metric based at least in part on an execution time per job for a batch of jobs;
determining a quantity of partitions for an additional batch of jobs, wherein the quantity of partitions is determined based at least in part on the execution time metric and on a target throughput;
dividing the additional batch of jobs between a set of partitions of the determined quantity, wherein the set of partitions comprises at least a first partition and a second partition; and
initiating execution of the additional batch of jobs in the set of partitions, wherein a first subset of jobs in the first partition is executed in parallel with a second subset of jobs in the second partition.

14. The non-transitory computer-readable storage medium as recited in claim 13, wherein the execution time metric comprises an exponential moving average of execution time per job for a plurality of batches of jobs, and wherein the quantity of partitions is determined based at least in part on a target throughput.

15. The non-transitory computer-readable storage medium as recited in claim 13, wherein the program instructions are further computer-executable to perform:
updating the execution time metric based at least in part on the execution of the additional batch of jobs;
determining an updated quantity of partitions for a further batch of jobs, wherein the updated quantity of partitions is determined based at least in part on the updated execution time metric, and wherein the updated quantity of partitions is larger or smaller than the quantity of partitions used for the execution of the additional batch;
dividing the further batch of jobs between an updated set of partitions of the updated quantity; and
initiating execution of the further batch of jobs in the updated set of partitions, wherein jobs in different partitions of the updated set are executed in parallel.

16. The non-transitory computer-readable storage medium as recited in claim 13, wherein an adaptive parallelization service in a service-oriented system performs determining the execution time metric, determining the quantity of partitions, and dividing the additional batch of jobs between the set of partitions, and wherein the adaptive parallelization service is offered to a plurality of clients generating streams of jobs.

17. The non-transitory computer-readable storage medium as recited in claim 13, wherein initiating the execution of the additional batch of jobs comprises sending the additional batch of jobs to a job execution service, wherein a cost of using the job execution service is assessed based on compute time, and wherein the partitions are maintained within the job execution service.

18. The non-transitory computer-readable storage medium as recited in claim 13, wherein determining the execution time metric comprises disregarding execution times for jobs that are determined to have failed.

19. The non-transitory computer-readable storage medium as recited in claim 13, wherein execution of the additional batch of jobs comprises execution of one or more classifier functions for items offered in a marketplace.

20. The non-transitory computer-readable storage medium as recited in claim 13, wherein a set of computing resources used for execution of a stream of jobs increases in size or capability as the execution time metric increases and decreases in size or capability as the execution time metric decreases.

* * * * *